(12) United States Patent
Huovinen et al.

(10) Patent No.: US 7,365,136 B2
(45) Date of Patent: *Apr. 29, 2008

(54) HIGH MELT STRENGTH POLYPROPYLENE

(75) Inventors: Paivi Huovinen, Ferrara (IT); Ali Harlin, Vantaa (FI); Pirjo Jaaskelainen, Porvoo (FI); Amir Karbasi, Espoo (FI); Nina Manner, Vantaa (FI)

(73) Assignee: Borealis Technology Oy, Porvoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 11/075,488

(22) Filed: Mar. 8, 2005

(65) Prior Publication Data

US 2005/0159564 A1 Jul. 21, 2005

Related U.S. Application Data

(62) Division of application No. 09/508,405, filed as application No. PCT/FI98/00764 on Sep. 28, 1998, now Pat. No. 6,875,826.

(30) Foreign Application Priority Data

Sep. 26, 1997 (FI) .......................... 973816

(51) Int. Cl.
*C08F 2/34* (2006.01)
*C08F 4/6592* (2006.01)
*C08F 4/614* (2006.01)
*C08F 210/06* (2006.01)

(52) U.S. Cl. ................ 526/64; 526/65; 526/125.3; 526/124.3; 526/160; 525/52; 525/53; 525/240

(58) Field of Classification Search ............... 525/52, 525/53, 240; 526/64, 65, 125.3, 124.3, 160
See application file for complete search history.

(56) References Cited

U.S. PATENT DOCUMENTS

| 5,047,485 A | 9/1991 | DeNicola, Jr. |
| 5,234,879 A | 8/1993 | Garoff et al. |

FOREIGN PATENT DOCUMENTS

| EP | 498603 | 8/1992 |
| EP | 573862 | 12/1993 |
| EP | 607703 | 7/1994 |
| EP | 627449 | 12/1994 |
| FI | 961152 | 9/1997 |
| WO | 92/19653 | 11/1992 |
| WO | WO92/19653 | 11/1992 |
| WO | WO92/19658 | 11/1992 |
| WO | WO94/26794 | 11/1994 |
| WO | WO95/12622 | 5/1995 |
| WO | WO 97/33117 A1 | 3/1997 |
| WO | WO 97/13790 | 4/1997 |
| WO | WO-13790 * | 4/1997 |
| WO | WO 97/33117 A1 | 9/1997 |
| WO | WO98/12234 | 3/1998 |

OTHER PUBLICATIONS

First page of FI 86866 corresponds to US 5,234,879.
First page of FI 900836 corresponds to US 5,047,485.
First page of FI 96615 corresponds to EP 0 627 449 A1.
First page of FI 95387 corresponds to EP 0 607 703 A1.
First page of FI 88047 corresponds to WO 92/19653.
First page of FI 88048 corresponds to WO 92/19658.
Macromol. Symp. 89 (1995) 73-89 Albizzati et al. "Recent Advances in Propylene Polymerization with MgCl2 Supported Catalysts".
Makromol. Chem. 192 (1991) 2857-2863 Harkonen et al. "External silane donors in Ziegler-Natta catalysis. An approach to the optimum structure of the donor".
Encyclopedia of Pol. Science & Eng. 2nd Edition, vol. 6 544-559 "Ethylene-Propylene Elastomers".
First page of FI 86866 corresponds to US 5,234,879, 1992.
First page of FI 900836 corresponds to US 5,047,485, 1990.
First page of FI 96615 corresponds to EP 0 627 449 A1, 1996.
First page of FI 95387 corresponds to EP 0 607 703 A1, 1995.
First page of FI 88047 corresponds to WO 92/19653, 1992.
First page of FI 88048 corresponds to WO 92/19658, 1992.
Encyclopedia of Pol. Science & Eng. 2nd Edition, vol. 6 544-559 "Ethylene-Propylene Elastomers", 1986.

* cited by examiner

*Primary Examiner*—Roberto Rabago
(74) *Attorney, Agent, or Firm*—Birch, Stewart, Kolasch & Birch, LLP

(57) ABSTRACT

The present invention concerns a high melt strength propylene polymer or copolymer suitable for manufacturing foams and thermoformed product exhibiting a melt strength of at least 3 g and comprising a high molar mass portion and a low or medium molar mass portion. The polymers are produced by subjecting propylene and optionally other olefins to polymerization in a plurality of polymerization reactors connected in series, employing different amounts of hydrogen as a molar mass modifier in at least two of the reactors, and carrying out the polymerization reaction in the presence of a catalyst system capable of catalyzing the formation of a high molar mass polymerization product having a $MFR_2$ of less than 0.1 g/10 min and a low or medium molar mass polymerization product having a $MFR_2$ of more than 0.5 g/10 min.

27 Claims, 4 Drawing Sheets

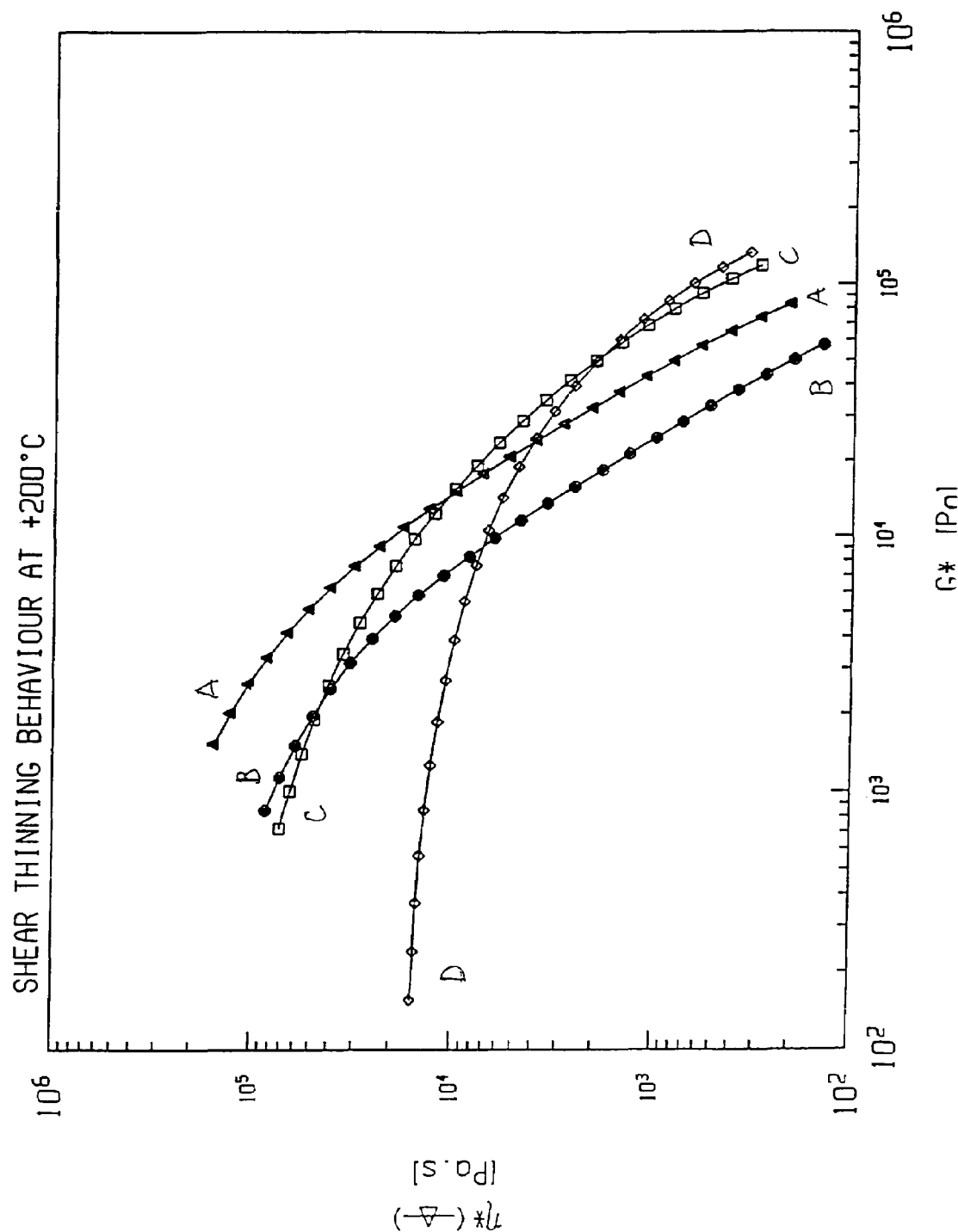

HIGH MELT STRENGTH POLYPROPYLENE

This application is a Divisional of application Ser. No. 09/508,405 filed on May 8, 2000, now U.S. Pat. No. 6,875,826, and for which priority is claimed under 35 U.S.C. § 120. application Ser. No. 09/508,405, U.S. Pat. No. 6,875,826, is the national phase of PCT International Application No. PCT/FI98/00764 filed on Sep. 28, 1998 under 35 U.S.C. § 371. The entire contents of each of the above-identified applications are hereby incorporated by reference. This application also claims priority of application Ser. No. 973816 filed in FINLAND on Sep. 26, 1997 under 35 U.S.C. § 119.

BACKGROUND OF THE INVENTION

1. Field of the Invention

The present invention relates to high melt strength polymers. In particular, the present invention concerns linear poly-propylene having high melt strength and comprising a high molecular weight portion and a low or medium molecular weight portion. The invention further concerns a process for preparing linear homopolymers and copolymers of propylene having high melt strength. Finally, the present invention relates to the use of the new polypropylene for the manufacture of products by, e.g., foaming, melt-stage thermo-forming, blow moulding, extrusion coating, fibre forming and injection moulding.

2. Description of Related Art

An important characteristic of polypropylene (PP) homopolymers is their stiffness, which is closely related to the crystallinity and the molecular structure of the polymer chain. Further, PP homopolymers have good resistance to deformation at elevated temperatures, high tensile strength, surface hardness, and good toughness at ambient temperatures. By copolymerizing propylene with other monomers it is possible further to improve the impact resistance.

The thermoformability of polypropylene in melt phase is, however, rather poor, which can be mentioned as a problem with polypropylene. This feature is primarily due to sheet sag during heating and forming processes. Generally, a material which is thermo-formable in the melt-phase should possess a viscous component to allow for flow when stressed and a sufficiently elastic component to resist flow when not stressed. Another important factor affecting thermoforming is the melt drawability of the polymer which depends on extensional viscosity. Similarly, the viscous and elastic components are beneficial for forming of blow moulded and foamed PP products.

The two major parameters that contribute to the viscoelastic behaviour are molar mass and molar mass distribution.

Melt strength means the force needed in extension to break the polymer melt. Linear polymers generally have considerably low melt strength. For polypropylene the most determining parameter is the molar mass: the higher the molecular mass of the material, the higher the melt strength.

Known in the art (WO 94/26794, PoliBrasil) is a method of preparing high melt strength polypropylene by a continuous process, wherein propylene is polymerized in at least two polymerization vessels by adding discrete amounts of hydrogen as a molar mass regulator to at least one of the polymerization vessels to produce high melt strength polypropylene. The resulting polymer product contains 10 to 35% of a higher molar mass portion and 65 to 90% of a lower molar mass portion. The process equipment comprises five slurry reactors connected in series, the amount of hydrogen fed to the polymerization vessels being successively reduced from the second polymerization vessel on.

In rheological terms, the polypropylene of WO 94/26794 is unsatisfactory as a high melt strength resin, because the zero viscosity and the shear thinning behaviour are rather similar to that of a conventional polypropylene used for comparison in the Examples of the reference. Thus, the products are not well suited to the manufacture of, e.g., foamed articles. Very little information on the catalysts used is given; in particular there is no teaching on hydrogen sensitivity of the catalyst or on any catalyst donors employed.

Further, because of the afore-mentioned process configuration, no hydrogen can be removed between the reactors, which limits the possibilities of varying the process conditions of the polymerization reactors. Thus, e.g., the high molar mass portion has to be made in the first reactor and the low molar mass portion in the second reactor. In a slurry process (such as the one of WO 94/26794), carried out e.g. in heptane slurry, generally a $TiCl_3$ catalyst having low activity is used, because the activity level has to be controlled in the process due to limited heat transfer in these kind of processes.

Another patent, EP 0 498 603 (Amoco), describes a multireactor process for preparing polypropylene having a broad molecular mass distribution which, expressed as the ratio $M_w/M_n$, lies in the range of 7 to 11. This high stiffness polypropylene, which has high shear thinning, is suitable for, e.g. moulding thin walled products. The manufacture of foamed articles is not mentioned and the propylene polymers of the reference do not exhibit the necessary melt strength for the production of light-weight polymer foams with closed cells.

Still another prior art publication, EP 0 573 862 (Himont), describes a polypropylene of very broad molecular mass distribution, $M_w/M_n > 20$. The polypropylene is claimed to have improved mechanical properties of high stiffness and improved resistance due to the broad MWD. The prior art process proposed for preparing the product comprises a multi-reactor gas phase process. The products are suggested for extrusion in thin sheets to be subjected to thermoforming. Once again, there is no suggestion of any use in foamed articles with closed cells and the polymers would not appear to have sufficiently high melt strength.

SUMMARY OF THE INVENTION

It is an object of the invention to eliminate the problems related to the prior art and to provide novel linear homopolymers and copolymers of polypropylene having high melt strength and suited for, in particular, the preparation of foamed, blow moulded or thermoformed articles.

A second object of the invention is to provide a novel process for preparing high melt strength linear polypropylene without post-polymerization of the polymer.

It is still a further object of the present invention to provide extruded and moulded products comprising high melt strength polypropylene.

These and other objects, together with the advantages thereof over known processes and products, which shall become apparent from the specification which follows, are accomplished by the invention as hereinafter described and claimed.

The invention is based on tailoring the molar mass distribution of the polymer in a two-step polymerization process by using different amounts of a molar mass regulator in at least two of the polymerization steps. In connection with the present invention it has been found that particularly useful products, suitable for, e.g. blow moulding, thermoforming and foaming, can be obtained by using Ziegler-Natta catalysts or metallocene catalysts having decreased chain transfer sensitivity. The hydrogen sensitivity of the catalysts and its impact on the melt strength of the polymers are not discussed in any of the above-mentioned references.

Basically, the present invention comprises the steps of
subjecting propylene and optionally other olefins to polymerization in a plurality of polymerization reactors connected in series,
using different amounts of hydrogen and possibly comonomers as molar mass modifiers or regulators in at least two of the reactors, and
carrying out the polymerization reaction in the presence of a catalyst system of low chain transfer sensitivity.

In connection with the present invention, it has been found that the high molar mass portion of the polymer product should be so high that a high viscosity at low shear stress rates approaching zero can be obtained. When the melt flow ratio, $MFR_2$, of the product is below approx 3 g/10 min, a nominal viscosity at low shear rate (<0.1 1/s) of about 40,000 Pa*s or more will provide a product having excellent melt strength which can be used for manufacturing foams and similar articles.

Thus, a polypropylene homopolymer or copolymer according to the present invention has improved melt strength, observed also in dynamic rheology as increased nominal viscosity at low shear rates of less than 0.1 /sec. Its molar mass distribution ($M_w/M_n$) is >6 and $MFR_2$ is 0.1 to 20, in particular below 5 and a nominal viscosity of more than 40,000 Pa*s.

More specifically, the polymer according to the invention is characterized by a melt strength of at feast 2.5 g, determined by the haul-off method and comprising a high molar mass portion and a low or medium molar mass portion, the high molar mass portion having a Melt Flow Rats ($MFR_2$) of less than 0.1 g/10 mm and the low or medium molar mass portion having a $MFR_2$ of more than 0.5 g/10 min and the polymer having a $MFR_2$ of 0.1 to 20 g/min.

For obtaining a product of the above kind the catalyst system used should be capable of catalyzing the formation of high molar mass polymerization products (homo- or copolymers of propylene) having a $MFR_2$ of less than 0.1 g/10 min, in particular less than 0.04 g/10 min. It should also be capable of catalyzing the formation of low or medium molar mass polymerization products having a $MFR_2$ of 0.5 g/10 min or more.

The preferred catalyst system used comprises a Ziegler-Natta catalyst having a solid catalyst component, a cocatalyst component and an external donor. The chain transfer sensitivity of such a Ziegler-Natta catalyst can be reduced by using an external donor which is strongly coordinating. These kinds of donors are in particular represented by the general formula I

wherein R' represents a branched or cyclic aliphatic, or aromatic group.

Another preferred catalyst system comprises metallocene catalysts.

More specifically, the process according to the present invention is mainly characterized by what is stated in the characterizing part of claim 8.

The present homo- or copolymers can be used for the manufacture of polymer foams, thermoformed products, films and sheets, products prepared by blow molding or stretch blow molding, extrusion coating and injection moulding.

The invention achieves a number of considerable advantages which will appear from the following description. However, it should be particularly pointed out that the present linear high melt strength PP exhibits excellent forming stability in melt phase because of the very high molar mass fraction resulting in high viscosity at low shear rates.

Good extrusion behaviour is obtained due to a broad molar mass distribution, which results in a lowered viscosity at high shear rates.

In extrusion coating, the present polymer will exhibit reduced melt resonance at high draw ratios (>15:1) and reduced neck-in. Products made by pipe extrusion and moulding will have improved properties, such as enhanced creep resistance. The polymer will also possess improved sag resistance, which is important in the thermoforming process. Furthermore, the material can be used to provide fibres of high resilience. In the calendering process, the present material will exhibit less adhesion to the heat rolls and improved grain retention.

Next, the invention will be more closely examined with the aid of the following detailed description and with reference to the attached drawings.

BRIEF DESCRIPTION OF THE DRAWINGS

FIG. 4 shows the shear thinning behaviour at +200° C. for three polypropylene products according to the present invention compared with a commercial unimodal polypropylene.

DETAILED DESCRIPTION OF THE INVENTION

Definitions

Figure 1:
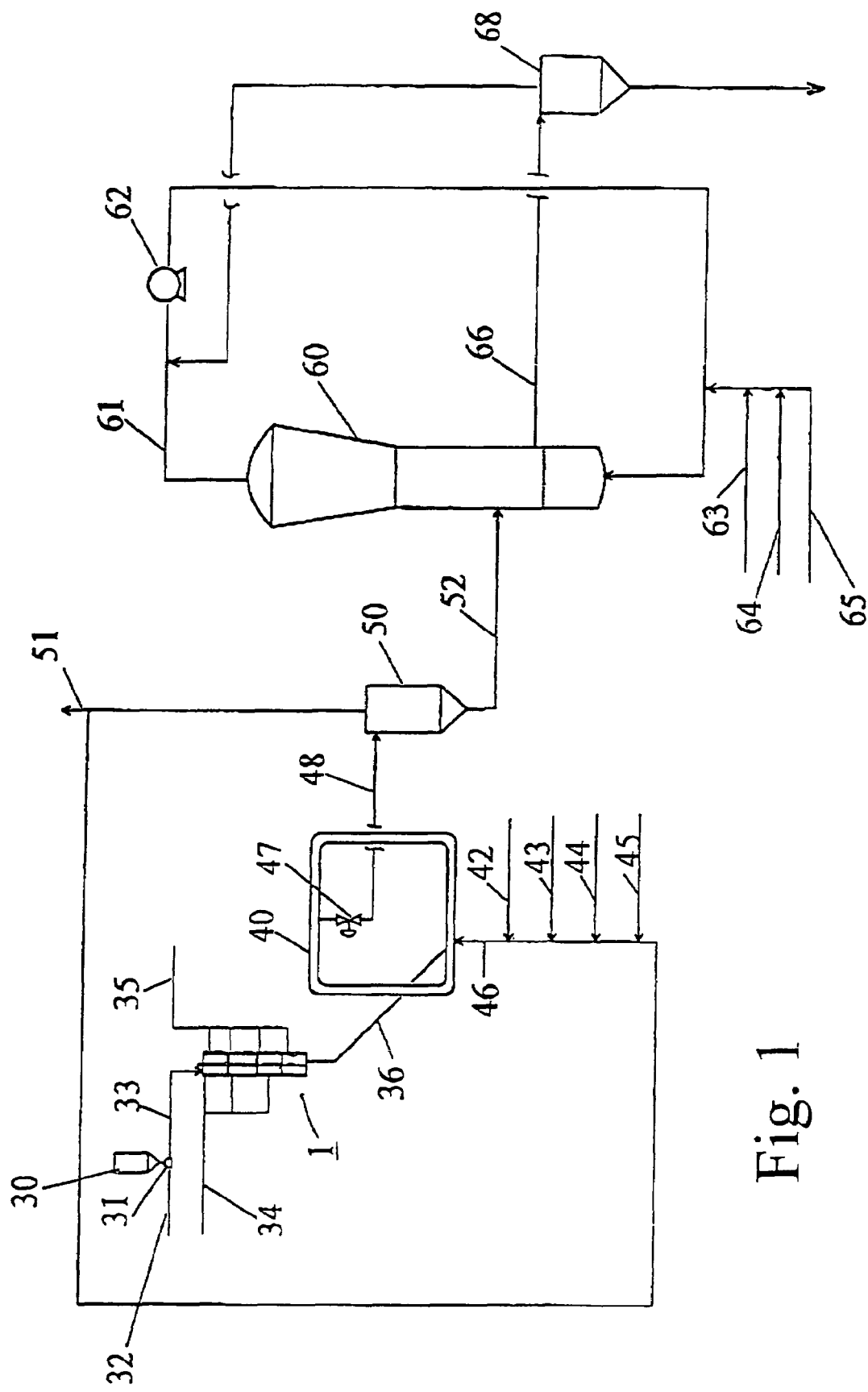
FIG. 1 depicts in a schematic fashion the process configuration of a first preferred embodiment of the invention.

The expression "using different amounts of hydrogen as a molar mass modifier" means in practice that only small amounts, if any, of hydrogen are employed in at least one reactor, whereas significant amounts, typically up to 10 to 15 mol hydrogen per kmol of propylene are used in at least one of the other reactors. As a result, a product containing a high molar mass portion and a low molar mass portion as obtained.

By "low (or reduced) chain transfer sensitivity" is meant that the number of chain transfer reactions occuring in the presence of the present catalyst system is smaller than the corresponding amount of chain transfer reactions in the presence of conventional catalyst with external electron donors, such as donor C, cyclohexyl methyl dimethoxy silane, and others.

"Strongly coordinating donor" designates donors which form relatively strong complexes with catalyst surfaces, mainly with a $MgCl_2$ surface in the presence of aluminium alkyl and $TiCl_4$. The donor components are characterized by strong complexation affinity towards catalyst surfaces and a sterically large and protective hydrocarbon (R'). Strong coordination with $MgCl_2$ requires oxygen-oxygen distance of 2.5 to 2.9 Å [Albizzati et al., Macromol. Symp. 89 (1995)

73-89]. Typically this kind of donors has the structure of the general formula II

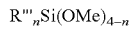

wherein R''' is a branched aliphatic or cyclic or aromatic group, and n is 1 or 2, preferably 2. [Härkönen et al., Macromol. Chem. 192 81991) 2857-2863].

Another group of such donors are 1,3-diethers having the formula III

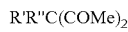

wherein R' and R'' are the same or different and stand for a branched aliphatic or cyclic or aromatic group.

By "Melt Flow Rate" or abbreviated "MFR" is meant the weight of a polymer extruded through a standard cylindrical die at a standard temperature in a laboratory rheometer carrying a standard piston and load. MFR is a measure of the melt viscosity of a polymer and hence also of its molar mass. The abbreviation "MFR" is generally provided with a numerical subindex indicating the load of the piston in the test. Thus, e.g., $MFR_2$ designates a 2.16 kg load and $MFR_{10}$ a load of 10.0 kg. MFR can be determined using, e.g., by one of the following tests: ISO 1133 C4, ASTM D 1238 and DIN 53735.

The Overall Process

The present invention concerns a multistage process for homo- or copolymerizing propylene to provide a product having high melt strength and a bimodal molar mass distribution comprising a high molar mass portion and a low or medium molar mass portion.

Propylene is polymerized in the presence of a Ziegler-Natta catalyst at an elevated temperature. Polymerization is carried out in a series of polymerization reactors selected from the group of slurry and gas phase reactors. Bulk polymerization in loop reactors is a particularly preferred embodiment of polymerization in slurry reactors. The high molar mass portion and the low or medium molar mass portion of the product can be prepared in any order in the reactors. If desired, the molar mass of the polymer can be raised by feeding a comonomer, such as ethylene, into the reactor.

The production split between the high molar mass polymerization reactor and the low or medium molar mass polymerization reactor is 5-95:95-5. Preferably, 50 to 90%, in particular, 70 to 90%, of the propylene homopolymer or copolymer is produced having a $MFR_2$ of 0.5 g/10 min or more and to provide a low or medium molar mass portion and 50 to 5%, in particular 30 to 10%, of the propylene homopolymer or copolymer is produced to provide a high molar mass portion having a $MFR_2$ of less than 0.1 g/10 min, in particular less than 0.04 g/10 min.

After preparation of the bimodal propylene homo- or copolymer, the properties of the product can be modified by copolymerizing propylene with comonomers that will give the product properties of improved impact strength, for example. This modification can be carried out in polymerization reactors connected in series with the actual polymerization reactors.

The high melt strength polymer according to the invention comprises 50 to 95% of a low or medium molar mass portion and 5 to 50 of a high molar mass portion and the Melt Flow Rate ($MFR_2$) of the homopolymer is about 0.1 to 20 g/10 min, preferably less than 10 g/10 min and in particular less than 5 g/10 min. The nominal viscosity of the polymer product is more than 40,000 Pa*s, in particular more than 45,000 Pa*s, at a Melt Flow Rate of 0.1 to 2 g/10 min. The melt strength of the polymer, determined by the haul-off method (as the highest value with highest possible haul-off speed before the polymer string is broken) is generally over 2.5, preferably 3 g or higher, in particular at least 5 g.

The main features of the present invention are the catalyst used, the polymerization reactor system and the properties of the polymer. These will be discussed in the following.

The Catalyst

As catalyst any stereospecific catalyst for propylene polymerization can be used, which will yield high molecular mass at low hydrogen-to-propylene ratios and low or medium molecular mass at high hydrogen-to-propylene ratios at the typical conditions prevailing in polymerization reactors. Thus, the catalyst should preferably be capable of catalyzing the formation of the high molar mass product and the low or medium molar mass product at a pressure of 10 to 100 bar, in particular 25 to 80 bar, and at a temperature of 40 to 110° C., in particular 60 to 100° C. The catalyst has decreased sensitivity to chain transfer reactions and preferably contains an external, strongly coordinating donor.

Generally, the catalyst comprises a catalyst component, a cocatalyst component, an external donor, the catalyst component of the catalyst system primarily containing magnesium, titanium, halogen and an internal donor.

Examples of suitable catalyst systems are described in, for example, Finnish Patents Nos. 86866, 96615 and 88047 and 88048.

One particularly preferable catalyst, which can be used in the present invention, is disclosed in FI Patent No. 88047. Another preferred catalyst is disclosed in Finnish Patent Application No. 963707.

A catalyst system useful in the present process can be prepared by reacting a magnesium halide compound with titanium tetrachloride and an internal donor. The magnesium halide compound is, for example, selected from the group of magnesium chloride, a complex of magnesium chloride with a lower alkanol and other derivatives of magnesium chloride. $MgCl_2$ can be used as such or it can be combined with silica, e.g. by absorbing the silica with a solution or slurry containing $MgCl_2$. The lower alkanol used can be preferably methanol or ethanol, particularly ethanol.

The titanium compound used in the preparation of the procatalyst is preferably an organic or inorganic titanium compound, having an oxidation state of titanium of 3 or 4. Also other transition metal compounds, such as vanadium, zirconium, chromium, molybdenum and tungsten compounds can be mixed with the titanium compound. The titanium compound usually is halide or oxyhalide, an organic metal halide, or a purely metal organic compound, in which only organic ligands have been attached to the transition metal. Particularly preferable are the titanium halides, especially $TiCl_4$. Preferably the titanation is carried out in two or three steps.

The alkoxy group of the phthalic acid ester used as an internal donor comprises at least five carbon atoms, preferably at least 8 carbon atoms. Thus, as the ester can be used for example propylhexyl phthalate, dioctyl phthalate, dinonyl phthalate, diisodecyl phthalate, di-undecyl phthalate, ditridecyl phthalate or ditetradecyl phthalate. The molar ratio of phthalic acid ester and magnesium halide is preferably about 0.2.

The transesterification can be carried out e.g. by selecting a phthalic acid ester—a lower alcohol pair, which spontaneously or with the aid of a catalyst, which does not damage the procatalyst composition, transesterifies the catalyst at an elevated temperatures. It is preferable to carry out the transesterification at a temperature, which lies in the range of 110 to 150° C., preferably 120 to 140° C.

The catalyst prepared by the method above is used together with an organometallic cocatalyst and with an external donor. Generally, the external donor has the formula IV $$R_nR'_mSi(R''O)_{4-n-m}$$

wherein
R and R' can be the same or different and they stand for a linear, branched or cyclic aliphatic, or aromatic group;
R" is methyl or ethyl;
n is an integer 0 to 3;
m is an integer 0 to 3; and
n+m is 1 to 3.

The aliphatic groups in the meanings of R and R' can be saturated or unsaturated. Linear $C_1$ to $C_{12}$ hydrocarbons include methyl, ethyl, propyl, butyl, octyl and decanyl. As examples of suitable saturated branched $C_{1-8}$ alkyl groups, the following can be mentioned: isopropyl, isobutyl, isopentyl, tert-butyl, tert-amyl and neopentyl. Cyclic aliphatic groups containing 4 to 8 carbon atoms comprise, e.g., cyclopentyl, cyclohexyl, methyl cyclopentyl and cycloheptyl.

According to the invention, particularly preferred donor are characterized as strongly coordinating donors which form relatively strong complexes with catalyst surface, mainly with $MgCl_2$ surface in the presence of aluminium alkyl and $TiCl_4$. The donor components are characterised by a strong complexation affinity towards catalyst surface and a sterically large and protective hydrocarbon. Typically a donor of this kind has the structure V $$R'''_nSi(OMe)_{4-n}$$

wherein R'" is branched aliphatic or cyclic or aromatic group, and n is 1 or 2, preferably 2. [Makromol Chem. 192 (1991) p. 2857-2863, Harkönen et. al.]

In particular, the external donor is selected from the group consisting of dicyclopentyl dimethoxysilane, diisopropyl dimethoxysilane, di-isobutyl dimethoxysilane, and di-t-butyl dimethoxysilane.

An organoaluminum compound is used as a cocatalyst. The organoaluminium compound is preferably selected from the group consisting of trialkylaluminium, dialkyl aluminium chloride and alkyl aluminium sesquichloride.

Optionally any metallocene catalyst of capable of catalyzing the high and low or medium molar mass product can be used. The hydrogen sensitivity of the metallocene catalyst can be different from that of a Ziegler-Natta catalyst which means that different hydrogen concentrations can be employed in the reactors.

The metallocene catalyst comprises a metallocene/activator reaction product impregnated in a porous support at maximum internal pore volume. The catalyst complex comprises a ligand which is typically bridged, and a transition metal of group IVA . . . VIA. The catalytic metal is typically halide, and aluminium alkyl. The ligands can belong to group of heterocyclic substituted or unsubstituted compouns, e.g. indocenes, naftenes, or any other bulky compound which can control the stereoselectivity of the catalyst especially when ligands are bridged together with silane or other chemical bond. The activator is selected from a group in which are derivates of water and aluminium alkyls e.g. trimethyl aluminium, triethyl aluminium, and tri t-butyl aluminium, or another compound capable of activating the complex. The metallocene/activator reaction product, a solvent capable of dissolving it, and a porous support are brought into mutual contact, the solvent is removed and the porous support is impregnated with the metallocene/activator reaction product, the maximum amount of which corresponds to the pore volume support, cf. International PCT Application No. PCT/FI94/00499.

One typical structure of metallocene compound having decreased sensitivity to chain transfer reactions is bridged bis(2-R-4-R'-indenyl) M $Cl_2$, wherein both R and R' are aliphatic, cycloaliphatic or aromatic hydrocarbons having 1 to 18 C atoms, R' is typically phenyl or naphthyl, and R is typically methyl or ethyl. M is a transition metal, typically titanium, zirconium or hafnium. R and R' may contain heteroatoms, such as silicon, nitrogen, phosphorous or germanium. The bridge between the indenyls is made from 1 to 3 atoms, such as carbon, silicon, nitrogen, phosphorous or germanium. A typical bridge is dimethylsilyl or ethyl. An example of such a metallocene compound is dimethylsilyl-bis(2-methyl-4-phenyl-indenyl)zirconium dichloride.

Prepolymerization

The catalyst can be prepolymerized prior to feeding into the polymerization reactor. During prepolymerization the catalyst components are contacted for a short period with a monomer, such as an olefin monomer, before feeding into the reactor. Examples of suitable systems are described in, e.g., Finnish Patent Application No. 961152. It is also possible, as described in Finnish Patent No. 95387, to carry out the prepolymerization in the presence of a viscous substance, such as an olefinic wax or an oil/wax mixture, to provide a prepolymerized catalyst which is stable during storage and handling. The catalysts pre-polymerized in wax will also allow for easy dosing of the catalyst into the polymerization reactors.

Polymerization Process

The equipment of the polymerization process following the optional prepolymerization step can comprise a series of polymerization reactors of any suitable type producing propylene homo- or comonomers of different molar masses in the presence and absence, respectively, of hydrogen or another molar mass regulator. Thus, the polymerization reactor system can comprise a series of conventional stirred-tank slurry reactors, as described in WO 94/26794. Preferably the reactors used are selected from the group of loop and gas phase reactors and, in particular, the process employs at least one loop reactor and at least one gas phase reactor. It is also possible to use several reactors of each type, e.g. one loop reactor and two or three gas phase reactors, in series. In the following the reactor system will be described with particular reference- to a system comprising one loop reactor (referred to as "the first reactor") and one gas phase reactor (referred to as "the second reactor"), in that order. However, it should be understood that the reactor system can comprise the reactors in any number and order.

In every polymerization step it is possible to use also comonomers selected from the group of ethylene, propylene, butene, pentene, hexene and alike as well as their mixtures. The use of comonomers other than ethylene is particularly preferred for the preparation of the low or medium molar mass portion.

In addition to the actual polymerization reactors used for producing the bimodal propylene homo- or copolymer, the polymerization reaction system can also include a number of additional reactors, such as pre- and/or postreactors. The prereactors include any reactor for prepolymerizing the catalyst and for modifying the olefinic feed, if necessary.

The postreactors (also referred to as the "third", "fourth" etc. reactor) include reactors used for modifying and improving the properties of the polymer product, e.g. impact resistance, as described above. All reactors of the reactor system are preferably arranged in series.

According to the invention, the polymerization comprises the steps of
- subjecting propylene and optionally other olefins to a first polymerization or copolymerization reaction in a first reaction zone or reactor,
- recovering the first polymerization product from the first reaction zone,
- feeding the first polymerization product to a second reaction zone or reactor,
- feeding additional propylene to the second reaction zone,
- subjecting the additional propylene to a second polymerization reaction in the presence of the first polymerization product to produce a second polymerization product, and
- recovering the second polymerization product from the second reaction zone, and
- separating and recovering the polypropylene from the second reaction product.

Thus, in the first step of the process, propylene with the optional comonomer(s) together with the catalyst is fed into the first polymerization reactor. Along with these components hydrogen as a molar mass regulator is fed into the reactor in the amount required for achieving the desired molar mass of the polymer. Alternatively, the feed of the first reactor can consists of the reaction mixture from a previous reactor, if any, together with added fresh monomer, hydrogen, optional comonomer and cocatalyst. In the presence of the catalyst, propylene and the optional comonomer will polymerize and form a product in particulate form, i.e. polymer particles, which are suspended in the fluid circulated in the reactor.

The polymerization medium typically comprises the monomer (i.e. propylene) and/or a hydrocarbon, and the fluid is either liquid or gaseous. In the case of a slurry reactor, in particular a loop reactor, the fluid is liquid and the suspension of polymer is circulated continuously through the slurry reactor, whereby more suspension of polymer in particle form in a hydrocarbon medium or monomer will be produced. According to a preferred embodiment, the first polymerization or copolymerization reaction is carried out in a reaction medium mainly consisting of propylene, Preferably at least 60 weight percent of the medium is formed by propylene.

The conditions of the slurry reactor are selected so that at least 10 wt-%, preferably at least 15 wt-%, of the whole production is polymerized in each slurry reactor. The temperature is in the range of 40 to 110° C., preferably in the range of 70 to 100° C. The reaction pressure is in the range of 25 to 100 bar, preferably 35 to 80 bar.

In slurry polymerization more than one reactor can be used in series. In such a case the polymer suspension in an inert hydrocarbon or in monomer produced in the slurry reactor is fed without separation of inert components and monomers periodically or continuously to the following slurry reactor, which acts at lower pressure than the previous slurry reactor.

The polymerization heat is removed by cooling the reactor by a cooling jacket. The residence time in the slurry reactor must be at least 10 minutes, preferably 20-100 min for obtaining a sufficient degree of polymerization.

According to one embodiment of the invention light inert hydrocarbons are fed to the reactor. Examples of such hydrocarbons are iso-butane, n-butane and isopentane. The light, inert hydrocarbon in the polymerization mixture lowers the pressure required in the reactor. The increased catalyst activity at relatively high temperature compensates for the decreased activity due to lowered concentration of propylene.

As discussed above, if a low or medium molar mass polypropylene is the desired product, hydrogen is fed into the reactor. Hydrogen can be added to the reactor at ratio of at least 1.5 mol $H_2$/kmol propylene, preferably 1.5-15 mol $H_2$/kmol propylene.

If the first polymerization reaction is carried out in the presence of hydrogen, then the pressure of the first polymerization product including the reaction medium is preferably reduced after the first reaction zone in order to evaporate volatile components of the product, e.g. in a flash tank. An overhead stream obtained from the evaporation of volatile components is condensed, and a concentrated fraction of propylene is recovered from the condensed stream and recirculated to the first reactor. As a result of the flashing, the product stream containing the polypropylene is freed from hydrogen and can be subjected to a second polymerization in the presence of additional propylene to produce a high molar mass polymer. If, again, the high molecular mass polymer is produced in the first reactor, then the polymerization product can be directly conducted as such to the following reactor.

The second reactor is preferably a gas phase reactor, wherein propylene and optionally comonomers are polymerized in a gaseous reaction medium.

The gas phase reactor can be an ordinary fluidized bed reactor, although other types of gas phase reactors can be used. In a fluidized bed reactor, the bed consists of the formed and growing polymer particles as well as still active catalyst come along with the polymer fraction. The bed is kept in a fluidized state by introducing gaseous components, for instance monomer on such flowing rate which will make the particles act as a fluid. The fluidizing gas can contain also inert carrier gases, like nitrogen and also hydrogen as a modifier. The fluidized gas phase reactor can be equipped with a mechanical mixer.

The gas phase reactor used can be operated in the temperature range of 50 to 115° C., preferably between 60 and 110° C. and the reaction pressure between 10 and 40 bar and the partial pressure of monomer between 2 and 30 bar.

The pressure of the second polymerization product including the gaseous reaction medium can then be released after the second reactor in order optionally to separate part of the gaseous and possible volatile components of the product, e.g. in a flash tank. The overhead stream or part of it is recirculated to the second reactor.

If desired, the polymerization product can be fed into a second gas phase reactor in which a rubbery copolymer is provided by a third (co)polymerization reaction to produce a modified polymerization product. This third polymerization reaction will give the polymerization product properties of e.g. improved impact strength. The step of providing an elastomer can be perfomed in various ways. Thus, preferably an elastomer is produced by copolymerizing at least propylene and ethylene into an elastomer. The conditions for the copolymerization are within the limits of conventional EPM production conditions such as tehy are disclosed, e.g., in Encyclopedia of Polymer Science and Engineering, Second Edition, Vol. 6, p. 545-558. A rubbery product is formed if the ethylene repeating unit content in the polymer lies within a certain range. Thus, preferably, ethylene and propylene are copolymerized into an elastomer in such a ratio that the copolymer contains from 10 to 70% by weight of ethylene units. In particular, the ethylene unit content is from 30 to 50% by weight of the copolymer propylene/ethylene elastomer. In other words, ethylene and propylene are copolymerized into an elastomer in a molar ratio of ethylene-to-propylene of 30/70 to 50/50.

The elastomer can also be provided by adding a ready-made or natural elastomer to the polymer product of the first gas phase reactor.

Summarizing what has been stated above, one particularly preferred embodiments of the invention comprises the following steps:

propylene is polymerized in a loop reactor at a pressure of 25 to 80 bar, at a temperature of 60 to 100° C. to provide a low or medium molar mass polymerization product, the polymerization product of the loop reactor is recovered and conducted to a flash tank, wherein an overhead product containing hydrogen and non-reacted propylene is separated from a bottom product containing polymerized solids, at least a part of the overhead product is recycled to the loop reactor, the bottom product is conducted to a gas phase reactor, additional propylene and, optionally ethylene, is fed to the gas phase reactor, the additional propylene is subjected to polymerization at a pressure of 20 bar or more to provide a high molar mass polymerization product, the polymerization product of the gas phase reactor is recovered and conducted to a flash tank, wherein the pressure of the product is reduced to produce an overhead product containing hydrogen and non-reacted propylene and a bottom product primarily containing polymerized solids, and polypropylene polymer is recovered from a part of the bottom product of the flash tank.

According to the present, at least a part of the overhead product can be recycled to the loop reactor, but it is also possible to conduct the overhead product directly to the gas phase reactor after at least a partial separation of hydrogen.

According to the second particularly preferred embodiment:

propylene and optional ethylene is polymerized in a loop reactor at a pressure of 25 to 80 bar, at a temperature of 60 to 100° C. to provide a high molar mass polymerization product, the polymerization product and reaction medium of the loop reactor is conducted directly to a gas phase reactor fluid bed, additional propylene, if desired, is fed to the gas phase reactor, propylene is subjected to polymerization in the gas phase reactor at a pressure of 20 bar or more to provide a low or medium molar mass polymerization product, the polymerization product of the gas phase reactor is recovered and conducted to a flash tank, wherein the pressure of the product is reduced to produce an overhead product containing hydrogen and non-reacted propylene and a bottom product primarily containing polymerized solids, at least a part of the overhead product is recycled to the gas phase reactor, and polypropylene polymer is recovered from a part of the bottom product of the flash tank.

The optional addition of ethylene in the reactor producing a high molecular mass fraction increases the actual molar mass produced in the reactor. Ethylene can also be added to the reactor producing a low MW fraction and the increased MW can be compensated with extra hydrogen.

These two preferred embodiments are also depicted in the attached drawings, which illustrate the particular configuration of process equipment used. The reference numerals used in the drawings are common for both embodiments, since the apparatus is largely the same. The numerals refer to the following apparatuses:

1 prepolymerization reactor
30 catalyst reservoir
31 feeding device
32 diluent
33 catalyst/diluent mixture
34 monomer
35 cocatalyst and possible donors
40 loop reactor
42 diluent feed (optional)
43 monomer feed
44 hydrogen feed
45 comonomer feed (optional)
46 back to the loop reactor 40 through the line 46
47 one or several exhaust valve
48 product transfer line
50 flash separator
51 recovery unit and off gas vent
52 removing line
60 gas phase reactor
61 gas transfer line
62 compressor
63 monomer feed
64 comonomer feed
65 hydrogen feed
66 transfer line
67 product transfer line
68 recovery system Turning to FIG. 1, it can be noted that catalyst from reservoir 30 is fed to the feeding device 31 together with diluent from line 32. The feeding device 31 feeds the catalyst/diluent mixture into the prepolymerization chamber 1 via line 33. Monomer is fed through 34 and cocatalyst and possible donors can be fed into the reactor 1 through conduits or lines 35.

From the prepolymerization chamber 1 the prepolymerized catalyst is removed preferably directly through line 36 and transferred to a loop reactor 40. In the loop reactor 40 the polymerization is continued by adding a diluent from the line 42, monomer from line 43, hydrogen from line 44 and an optional comonomer from line 45 through the line 45 through the line 46. An optional cocatalyst can also be introduced into the loop reactor 40.

From the loop reactor 40 the polymer-hydrocarbon mixture is fed through one or several exhaust valves 47 and the product transfer line 48 to the flash separator 50. The hydrocarbon medium removed from the polymer particles, the remaining monomer and hydrogen are removed from the flash separator 50 either through the line 51 to the recovery unit (not presented) or back to the loop reactor 40 through the line 46. The polymer particles are removed from the flash separator 50 through the removing line 52 to the gas phase reactor 60. The gas phase reactor is advantageously equipped with a mixer (not presented).

In the lower part of the gas phase reactor 60 there is a bed consisting of polymer particles, which will be kept in a fluidized state in an ordinary way by circulating the gases removed from the top of the reactor 60 through line 61, compressor 62 and a heat exchanger (not presented) to the lower part of the reactor 60 in an ordinary way. The reactor 60 is advantageously, but not necessarily, equipped with a mixer (not presented). To the lower part of the reactor 60 can be led in a well known way monomers from line 63, optionally comonomer from line 64 and hydrogen from the line 65. The product will be removed from the reactor 60 continually or periodically through the transfer line 66 to the recovery system 68. The overhead product of the recovery system is recirculated to the gas reactor.

Figure 2:
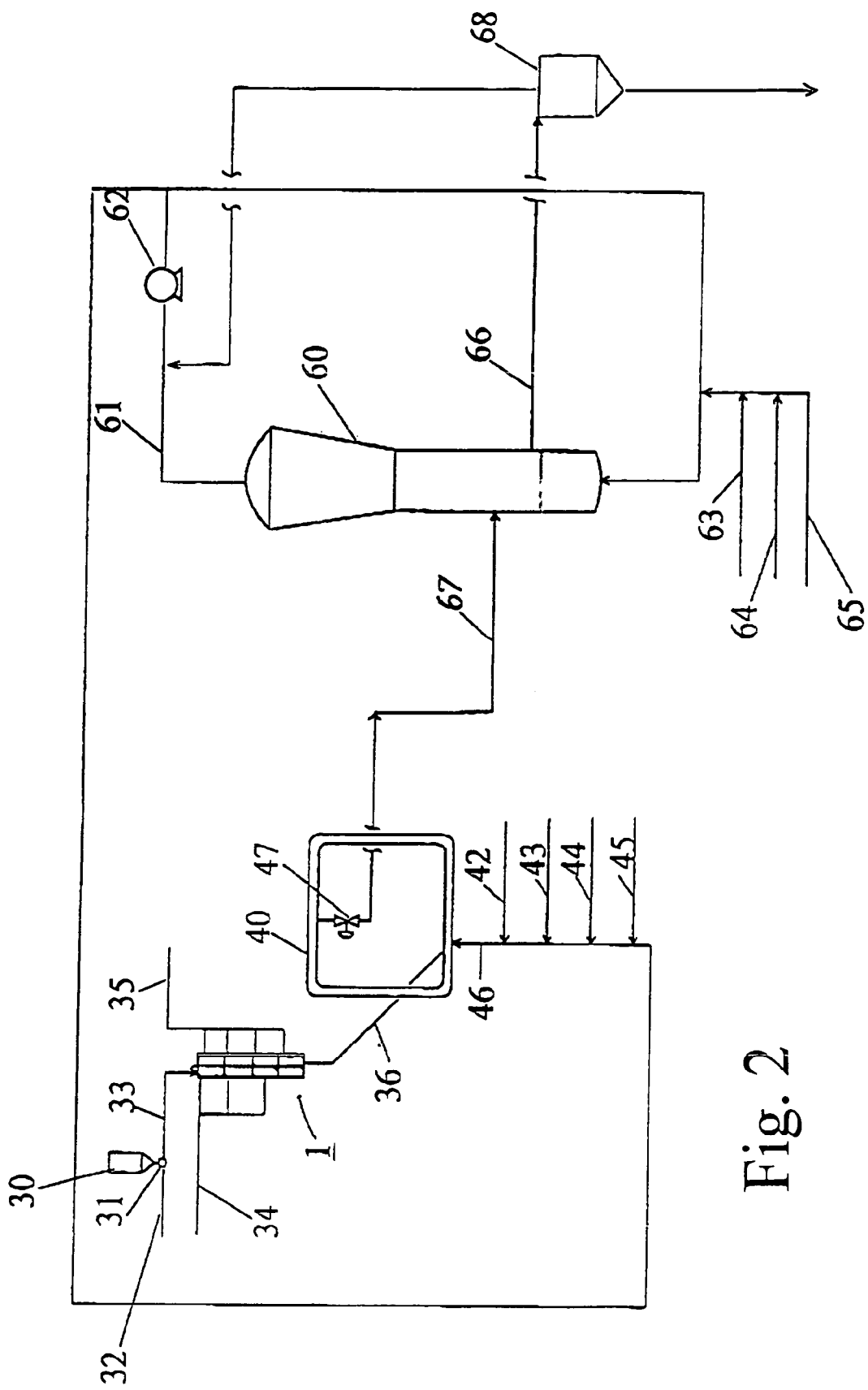
FIG. 2 depicts the process configuration of a second preferred embodiment of the invention.

The embodiment shown in FIG. 2 differs from the one in FIG. 1 only in the sense that hydrogen is fed only or primarily into the gas phase reactor 60. Thus, there is no need to provide the first reactor 40 with a flash tank 50. Instead there is a direct product transfer 67 from the loop reactor 40 to gas phase reactor 60.

The Product

By means of the present invention, a propylene homopolymer or copolymer is produced having improved shear thinning and melt elasticity values. The higher the shear thinning index, the higher the melt elasticity. The properties are manifested in dynamic rheology as increased nominal viscosity at shear rates <0.1/sec. It is obvious that both properties are influenced by high molar mass tails. The high molar mass tails also give improve melt strength characterized by the haul-off method. The molar mass distribution of the polymer is >6, preferably >8, and the Melt Flow Rate ($MFR_2$) 0.1 to 20 g/10 min. The melt strength of the polymer product (determined by the haul-off method described below) is over about 2 to 2.5 g, preferably it is at least 3 g and, in particular it is over 5 g. By feeding (e.g. about 0.01 to 5 mole-%) ethylene as a comonomer to the reactor wherein the high molar mass is produced, it is possible further to increase the melt strength.

It should be noticed that due to the specific composition of the present bimodal polymers, comprising a high molar mass portion with a rather high molar mass, the melt strength of the present polymers is about 1.5 times (or more) higher than for corresponding unimodal polymers having an equal or similar Melt Flow Rate.

MFR measurements show that polymerization of propylene without any addition of hydrogen into the reactor vessel results in the formation of polypropylenes with very high molar mass. In addition, the molar mass is dependent on the catalyst system used as well as on the polymerization conditions.

Typically, the $MFR_2$ of polypropylene made in liquid monomer essentially or entirely in the absence of hydrogen using a catalyst system containing a strongly complexing donor is less than 0.02 g/10 min, e.g. approximately 0.01 g/10 min, whereas a corresponding catalyst system with a less strongly complexing donor, under the same conditions, typically gives polypropylene with a $MFR_2$ of >0.04.

Molar mass distributions are broad, $M_w/M_n$>6, preferably >8. It should be noted that when the portion of the high molar mass is small and the molar mass very high, the MWD can be difficult to determine using standard methods such as GPC.

The homopolymer or copolymer described above can be used for the manufacture of polymer foams, thermoformed products, films and sheets, and products prepared by blow molding or stretch blow molding, extrusion coating or injection moulding.

In particular, the novel propylene polymers can be employed for manufacturing foamed materials, such as beads, strands, sheets, laminated sheets, netting and profiles. The present polymers will provide foams with closed cells and densities in the range from 20 to 400 kg/m$^3$, in particular about 20 to 60 kg/m$^3$. The foamed materials can be used, for example, as moulded parts in the automotive industry, in flooring, for pipe insulation, or in sheets for thermoforming.

The novel polymers can be processed into foamed materials by methods known per se. Thus, they can be extrusion foamed in a extruder, such as a single screw extruder, twin screw extruder or a tandem extruder. The polymers according to the invention can also be foamed by using a physical blowing agent or a chemical blowing agent or a combination thereof. As examples of physical blowing agents the following can be mentioned: $CO_2$, different hydrocarbons (including propane and butane), $H_2O$ and CFC's and mixtures thereof. The chemical blowing agent can be selected from the group consisting of inorganic carbonates, citric acid and azodicarbon amide and mixtures thereof. A bubble initiator, such as talc or citric acid, can be used to improve the foam structure.

The present polymers and copolymers of propylene can be blended and optionally compounded with additives and adjuvants conventionally used in the art. Thus, suitable additives include antistatic agents, flame retardants, light and heat stabilizers, pigments and carbon black. Fillers such as mica can also be used. Further, the polymers and copolymers can be blended with other polymers, in particular other polyolefins, such as LD-, LLD-, MD- and HD-polyethylenes and polybutylene.

EXAMPLES

The following non-limiting examples illustrate the invention.

In the Examples, the Melt Flow Rate was measured at 230° C. using piston having loads of 2.16 kg and 10 kg. The abbreviations $MFR_2$ and $MFR_{10}$ are used for designating the melt flow rate measured at these conditions.

Dynamic rheological measurements were performed by Rheometrics System IV rheometer in a frequency range from 0.01 to 400 Hz at 200° C.

Shear thinning index (SHI) is defined as a ratio of shear viscosities measured at two different shear stresses: SHI=$\eta$ (G*=2 kPa)/$\eta$(G*=50 kPa). $\eta_0$ stands for the viscosity measured at zero shear stress.

Figure 3:
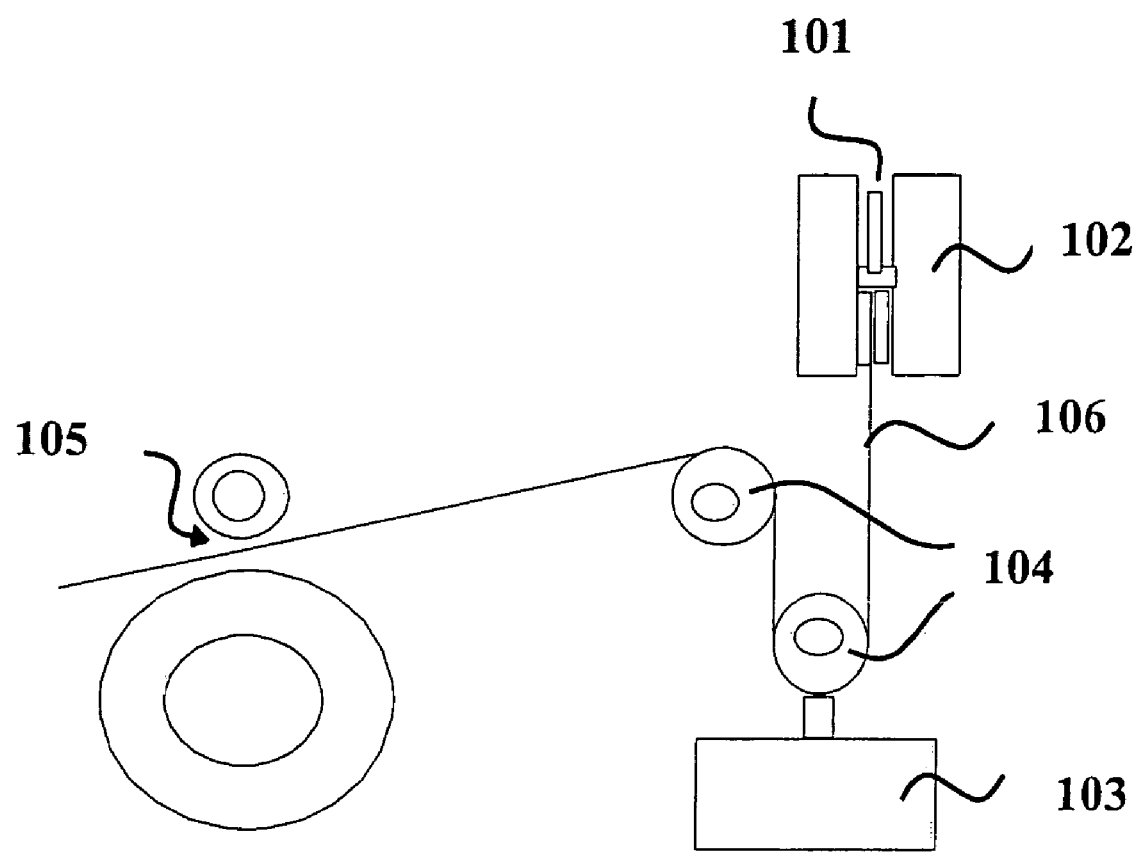
FIG. 3 shows a haul-off equipment which can be used for measuring melt strength.

Melt strength has been determined by rheologic measurements on a "haul-off equipment". (see FIG. 3). The haul-off equipment comprises a rosand capillary 101, a rheometer system 102, a balance 103, a pulley block combination 104 and a haul-off unit 105. A polymer string 106 formed from polymer melt in the capillary 101 is suspended from the rheometer system 102 and extended by the haul-off unit 105. The balance 103 will register the extensional viscosity (or melt strength) in terms of weight (g). Melt strength is determined as the highest value with highest possible haul-off speed before the polymer string is broken.

Example 1

Polymerization of Propylene on Laboratory Scale

Propylene was polymerized on bench scale by producing a polymer fraction of high molar mass in a first polymerization step without any addition of hydrogen and in a second polymerization step, which was carried out in the presence of hydrogen in order to broaden the molar mass distribution and increase the final MFR to required level.

The polymerizations were carried out in the presence of a Ziegler-Natta catalyst with an external electron donor corresponding to the general formula I and V above (dicyclopentyl dimethoxy silane, in the following abbreviated "D"). The catalyst was prepared according to the method described in FI Patent No. 88047. A polymer prepared in the presence of a corresponding catalyst system containing a conventional donor corresponding to the general formula IV (cyclohexyl methyl dimethoxy silane or abbreviated "C") was tested. As a reference, a commercial polypropylene was used. Polymerizations were made in liquid propylene where the first polymerization step was made without any hydrogen in the feed and the second step in the presence of hydrogen.

The results of the polymerizations are summarized in Table 1.

TABLE 1

Results of the two step polymerizations

| Property | A | B | C | Normal commercial PP |
|---|---|---|---|---|
| Catalyst donor | D | D | C | C |
| $MFR_2$, g/10 min | 1.0 | 1.8 | 1.2 | 1.9 |
| $H_2$ (1st step)/ $H_2$ (2nd step)/ mmol | 0/500 | 0/800 | 0/96 | — |
| $MFR_2$(1st step) $MFR_2$(2nd step) | 0.008/24 | 0.008/58 | 0.04/14 | — |
| Split | 30/70 | 30/70 | 30/70 | 100 |
| min/min | 30/15 | 30/17 | 30/21 | |
| Activity, kg/$g_{cat}$ | 28.5 | 27.3 | 20.9 | — |
| SHI (2/50) | 180 | 240 | 24 | 5.9 |
| η(2 kPa) (Pa*s) | 170,000 | 48,000 | 46,000 | 10,000 |
| Melt strength, g | 6 | 10 | 3 | 1.4 |

Polymerization conditions: Al/Ti = 250;
Al/D = 10;
propylene = 840 g;
$T_p$ = 70° C.

As will appear from the above data, the polymerization of propylene without any addition of hydrogen into the reactor vessel results in the formation of polypropylenes with very high molar mass.

The viscosity curves of the above four different polypropylene polymers are also depicted in FIG. 4.

As will appear from FIG. 4, the viscosity of the polymer with decreasing shear rate was most pronounced with the polymers of the present invention. Thus, SHI of the present polymers polymers were 180 ($MFR_2$=1.0 g/10 min) and 240 ($MFR_2$=1.8 g/10 min), which are much higher than that of standard grade with narrow MWD (SHI=5.9, $MFR_2$=1.9 g/10 min). The polymer C prepared using a less strongly coordinating donor showed much lower shear thinning with increasing shear rate (SHI=24, $MFR_2$=1.2 g/10 min). The different behaviour of the tested catalysts indicates that the molar mass distribution of the preferred polymers is much broader than the MWD of the polymer made with a less strongly coordinating donor.

As a result of the fraction of very high $M_w$, the present polymers have a much higher melt strength than reference grade polymers. Thus, the melt strength of polymer B, measured by the haul-off method, was 10, whereas the reference polymer D had a melt strength of 1.4. The higher melt strength of the present polymers is due to the broader MWD of the polymer and the presence of a very high molar mass fraction.

Example 2

Two-Stage Continuous Polymerization of Propylene

Propylene homopolymers were produced in a pilot plant having a loop reactor and an agitated fluid bed gas-phase reactor connected in series. The catalyst, cocatalyst, and an external donor were fed into the loop reactor. The reaction medium, including hydrogen, of the loop was flashed away before the solid polymer containing the active catalyst entered the gas-phase reactor.

A prepolymerized $MgCl_2$ supported Ti-catalyst (prepared according to FI Patent No. 88 047) was used in the polymerization. The cocatalyst was triethyl aluminium (TEA) and dicyclopentyl dimethoxy silane (DCPDMS) was used as an external donor. The Al/Ti mole ratio was 150 and Al/donor mole ratio 5.

In the first stage (loop reactor), a low molar mass propene homopolymer was produced and polymerization was continued in the second stage (gas-phase reactor) which produced high molar mass propene homopolymer. Hydrogen feed was used in the loop reactor to control the MFR of the product. No additional hydrogen was fed to the gas-phase reactor. The $MFR_2$ of the loop product was 24 g/10 min. The Al/Ti mol ratio in the polymerization was 250 and Al/donor mol ratio 10. $MFR_2$ of the final product was 2.8 g/10 min. Production rate ratio between the first and the second reactor was 85/15. Polymerization temperature in the loop reactor was 70° C. and in the gas phase reactor 75° C. The polymer had an $\eta_0$ of 55,300 Pa*s, a SHI (0/50) of 83 and a melt strength of 3 g.

Example 3

Two-Stage Continuous Copolymerization of Propylene and Ethene

Polymerization of propylene in a loop reactor was carried out as in Example 2 but using higher hydrogen feed in order to adjust $MFR_2$ to 180 in the loop reactor. The reaction was continued in a second stage (a gas-phase reactor) where no hydrogen but additional propylene and 2.5 mol-% ethylene were fed. The $MFR_2$ of the product was 2.6 g/10 min and ethylene content 0.8 wt-%. The production rate ratio between the first and the second reactor was 70/30. Polymerization temperatures and Al/Ti and Al/donor mol ratios were as in Example 2. The polymer had an $\eta_0$ of 116,300 Pa*s, a SHI (0/50) of 261 and a melt strength of 5 g.

Example 4

Two-Stage Continuous Copolymerization of Propylene and Ethylene

Propylene copolymers were produced in pilot plant having a loop reactor and a fluid bed gas-phase reactor connected in series. The catalyst, cocatalyst and donor, as in Example 2, were fed into the loop reactor.

In the first stage (loop reactor), there was produced a high molar mass copolymer of propylene and ethylene having a $MFR_2$ of 0.03 g/10 min and ethylene content of 2.5 wt-%. Polymerization was continued in the second stage (gas-phase reactor) without flashing the non-reacted monomers between the reactors. In the gas-phase reactor the low molar mass homopolymer fraction was produced by adding additional propylene and hydrogen to the reactor. $MFR_2$ of the final product was 1.9 g/10 min and ethylene content 1.3 wt-%. Production rate ratio between the reactors was 30/70.

Polymerization temperatures and Ai/Ti and Al/donor mol ratios were as in Example 2. The polymer had an $\eta_0$ of 199,400 Pa*s, a SHI (0/50) of 354 and a melt strength of 9 g.

Example 5

Two-Stage Continuous Polymerization of Propylene

Propylene homopolymers were produced in pilot plant having a loop reactor and a fluid bed gas-phase reactor connected in series. The catalyst, cocatalyst and donor, as in Example 2, were fed into the loop reactor.

In the first stage (loop reactor), there was produced a high molar mass homopolymer of propylene having a $MFR_{10}$ of 0.2 g/10 min. Polymerization was continued in the second stage (gas-phase reactor) without flashing the non-reacted monomers between the reactors. In the gas-phase reactor the low molar mass homopolymer fraction was produced by feeding additional propylene and hydrogen to the reactor. The $MFR_2$ of the final product was 4.5 g/10 min. Production rate ratio between the reactors was 20/80. Polymerization temperatures in the first and second step were 68 and 75° C., respectively, the Al/Ti molar ratio was 250 and the Al/donor molar ratio was 20. The polymer had an $\eta_0$ of 49,000 Pa*s, a SHI (0/50) of 134 and a melt strength of 3 g.

Example 6

Two-Stage Continuous Polymerization of Propylene on Bench Scale

Propylene was polymerized on bench scale by producing a polymer fraction of high molar mass in a first polymerization step without any addition of hydrogen and in a second step which was carried out in the presence of hydrogen in order to broaden the molar mass distribution and increase the final MFR to required level.

The polymerization was carried out in the presence of a supported dimethylsilyl-bis(2-methyl-4-phenyl-indenyl)zirconium dichloride/methylaluminioxane catalyst.

Polymerization was made in liquid propylene at a temperature of 70° C., the first 20 min polymerization step being carried out without any hydrogen in the feed and the second step (60 min) in the presence of 30 mmol hydrogen.

The activity of the catalyst was 0.81 kg/g cat and the MFR2 of the polymer was 1.2 g/10 min. The polymer had a molar mass distribution, $M_w/M_n$, of 10 and an excellent melt strength.

The invention claimed is:

1. A process for preparing linear high melt strength propylene homopolymers and copolymers, comprising the steps of
    subjecting propylene and optionally other olefins to polymerization in a plurality of polymerization reactors connected in series wherein said reactors are selected from the group consisting of loop reactors and gas phase reactors and wherein said reactors comprise at least one loop reactor and at least one gas phase reactor,
    employing different amounts of hydrogen as a molar mass modifier in at least two of the reactors, and
    carrying out the polymerization reaction in the presence of a catalyst system which catalyzes the formation of a high molar mass polymerization product having a $MFR_2$ of less than 0.1 g/10 min and a low or medium molar mass polymerization product having a $MFR_2$ of more than 0.5 g/10 min, wherein the second reactor is a gas phase reactor, wherein propylene and optionally comonomers are polymerized in a gaseous reaction medium and wherein (a) an overhead stream from a flash tank or part of it is recirculated to the first reactor or (b) an overhead stream or part of it from the second reactor is recirculated to the first and second reactor.

2. The process according to claim 1, wherein said catalyst system comprises:
    a catalyst component comprising magnesium, titanium, halogen and optionally an internal donor, and
    a cocatalyst component, said catalyst system further comprising an external donor having the general formula of

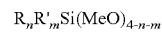
    $R_nR'_mSi(MeO)_{4-n-m}$ wherein R and R' are the same or different and represent branched or cyclic aliphatic or aromatic groups, and n and m are 0 or 1 and n+m is 1 or 2.

3. The process according to claim 1, wherein said catalyst system comprises:
    a catalyst component comprising magnesium, titanium, halogen and optionally an internal donor, and
    a cocatalyst component, said catalyst system further comprising an external donor having the general formal of

    $R'R''C(COMe)_2$ wherein R' and R" are the same or different and stand for a branched aliphatic, a cyclic or an aromatic group.

4. The process according to claim 1, wherein said catalyst system comprises a metallocene compound.

5. the process according to claim 4, wherein said metallocene compound in the metallocene catalyst is bridged bis(2-R-4-R'-indenyl)$MCl_2$, wherein both R and R' are aliphatic, cycloaliphatic or aromatic hydrocarbons having 1 to 18 C atoms, or R' is phenyl or napththyl and R is a lower alkyl, M is a transition metal, and R and R' may contain heteroatoms, and wherein the bridge between the indenyls comprises 1 to 3 atoms.

6. The process according to claim 5, wherein said heteroatoms are selected from the group consisting of silicon, nitrogen, phosphorous and germanium.

7. The process according to claim 5, wherein said atoms of the bridge between the indenyls are selected from the group consisting of carbon, silicon, nitrogen, phosphorous or germanium.

8. The process according to claim 4, wherein the metallocene compound is dimethylsilyl-bis(2-methyl-4-phenyl-indenyl)zirconiumdichloride.

9. The process according to claim 1, wherein 5 to 50% of the propylene homopolymer or copolymer has an $MFR_2<0.1$ g/10 min and 50 to 95% of the propylene homopolymer or copolymer has an $MFR_2>0.5$ g/10 min.

10. The process according to claim 1, wherein said reactors comprise a loop reactor and a gas phase reactor in that order.

11. The process according to claim 1, wherein ethylene is fed into the reactor in which the higher molar mass component is produced in order to increase reactivity and molar mass of the component.

12. The process according to claim 1, which further comprises the steps of
    subjecting propylene and optionally other olefins to a first polymerization or copolymerization reaction in a first reaction zone,
    recovering the first polymerization product from the first reaction zone, feeding the first polymerization product to a second reaction zone, feeding additional propylene to the second reaction zone, subjecting the additional propylene to a second polymerization reaction in the presence of the first polymerization product to produce a second polymerization product, and recovering the second polymerization product from the second reaction zone, and separating and recovering the polypropylene from the second reaction product.

13. The process according to claim 12, wherein the first polymerization or copolymerization reaction is in a reaction medium, at least 60 weight percent of which is formed by propylene, producing a polymerization product in particulate form.

14. The process according to claim 12, wherein the first polymerization reaction is carried out in a loop reactor.

15. The process according to claim 13, further comprising reducing the pressure of the first polymerization product including the reaction medium after the first reaction zone in order to evaporate volatile components of the product.

16. The process according to claim 15, wherein the pressure of the first polymerization product is reduced in a flash tank.

17. The process according to claim 15, wherein an overhead stream obtained from the evaporation of volatile components is condensed, a concentrated fraction of propylene being recovered from the condensed stream and recirculated to the first reactor.

18. The process according to claim 1, wherein the pressure of the second polymerization product including the gaseous reaction medium is reduced after the second reactor in order to separate part of the gaseous and possible volatile components of the product.

19. The process according to claim 17, wherein the pressure of the second reactor is reduced in a flash tank.

20. The process according to claim 1, wherein said linear high melt strength propylene homopolymers and copolymers produced exhibit a melt strength of at least 2.5 g, determined by the haul-off method and comprise a high molar mass portion and a low or medium molar mass portion, the high molar mass portion having a Melt Flow Rate ($MFR_2$) of less than 0.1 g/10 min and the low or medium molar mass portion having a $MFR_2$ of more than 0.5 g/10 min, the polymer having a $MFR_2$ of 0.1 to 20 g/10 min.

21. The process according to claim 1, wherein said propylene homopolymers and copolymers produced exhibit improved melt strength observed in dynamic rheology as increased nominal viscosity of greater than 40,000Pa*s at low shear rates of less than 0.1/sec and having a MWD of more than 6.

22. The process according to claim 1, wherein said propylene homopolymer or copolymer exhibits a melt strength of at least 5 g, determined by the haul-off method.

23. The process according to claim 1, wherein said propylene copolymers produced comprise 0.1 to 20 mole-% of ethylene residues.

24. The process according to claim 1, wherein said propylene homopolymers and copolymers produced are fed into a second gas phase reactor in which a rubbery copolymer is provided by a third (co)polymerization reaction to produce a modified polymerization product.

25. The process according to claim 24, wherein said rubbery component is selected from the group of: elastomers produced by copolymerizing at least propylene and ethylene.

26. The process according to claim 1, further comprising adding an elastomer to the polymer product of the first gas phase reactor.

27. The process according to claim 1, further comprising adding a natural elastomers to the polymer product of the first gas phase reactor.

* * * * *